Fig. 4.

J. H. HAMMOND, Jr.
APPARATUS FOR CONTROLLING TORPEDO FIRING.
APPLICATION FILED AUG. 5, 1915. RENEWED JAN. 11, 1921.

1,388,640.

Patented Aug. 23, 1921.
9 SHEETS—SHEET 8.

Inventor:
John Hays Hammond Jr.
by Emery, Booth, Janney and Varney
Attys.

UNITED STATES PATENT OFFICE.

JOHN HAYS HAMMOND, JR., OF GLOUCESTER, MASSACHUSETTS.

APPARATUS FOR CONTROLLING TORPEDO-FIRING.

1,388,640.  Specification of Letters Patent.  Patented Aug. 23, 1921.

Application filed August 5, 1915, Serial No. 43,879. Renewed January 11, 1921. Serial No. 436,614.

*To all whom it may concern:*

Be it known that I, JOHN HAYS HAMMOND, Jr., a citizen of the United States, and a resident of Gloucester, in the county of Essex and State of Massachusetts, have invented an Improvement in Apparatus for Controlling Torpedo-Firing, of which the following description, in connection with the accompanying drawings, is a specification, like characters on the drawings representing like parts.

This invention relates to apparatus for controlling torpedo firing.

In order that the principle of the invention may be readily understood, I shall proceed to describe the best method known to me and certain types of apparatus designed for controlling the firing of torpedoes from submarines. My invention, however, is in nowise limited to such use, but is adapted for the control of torpedo firing from a ship of any type or from the shore or other station.

Heretofore the firing of torpedoes from fixed tubes in moving vessels has been a matter of considerable difficulty especially in submarine work. The limitations of fixed tubes have been marked, inasmuch as forming, as they do, an integral part of the hull of the submarine, in order to train the tubes, it is necessary to train the longitudinal axis of the submarine in the direction of the target. Inasmuch as the tendency in submarine construction is continually to increase the length of these vessels and their displacement, it is obvious that the limitation of this type of torpedo firing is proportional to a great extent to the immobility of the large craft. In order to use the bow tubes the submarine is forced to advance head-on to the target. Should the enemy become aware of the position of the submarine, as has been shown, he will endeavor to run the submerged vessel down. On account of the position of the vessel in its head-on attack, the submarine finds itself in an extremely disadvantageous tactical position. Moreover with the present method of torpedo firing, only certain tubes can be fired at a time, and these tubes in their positioning require that certain fixed maneuvers be carried out by the submarine. In my system of torpedo fire control, I have devised methods whereby torpedoes may be fired from fixed tubes irrespective of the orientation of the longitudinal axis of the submarine, and whereby a plurality of torpedoes can be fired by different tubes, so as if desired to converge toward a given target, or to diverge over a given area of water.

In order to achieve these results, I have devised a centralized method of control which I consider to be the most practicable method whereby the above mentioned effects can be obtained, but to which I am not limited in all aspects of my invention, as the same may be widely varied within the scope and purpose thereof.

In employing a centralized method of control, I preferably employ some suitable type of sighting apparatus. I employ the term "sighting apparatus" and like terms, in a broad and generic sense, inasmuch as it may be embodied in many widely varied structures. In the disclosed embodiment of my invention, I have represented a periscope or a plurality of periscopes as constituting a sighting apparatus. I may, however, employ other devices equally well known to the art and which it is not necessary to refer to in detail. For example, instead of using a telescope or periscope, I may for night attack, utilize a standard projector whose rotation in a horizontal plane is mechanically, electrically or otherwise linked with specific elements in the gyroscope or other direction-maintaining means. Thus, by placing the beam on the target or ahead of the target and firing the torpedoes, it is possible to control them with great accuracy. In day time, even an indicating dial may be used which may be rotated in a horizontal plane, such rotation mechanically or electrically controlling specific elements of the gyroscope. Said dial may be of any suitable form and manually operated so as to point either at or ahead of the object of attack.

Said instrumentalities and others not herein referred to are comprehended by me under the term "sighting means," "sighting apparatus," "sighting instrumentalities," and cognate terms.

Referring more particularly to the drawings, wherein I have disclosed certain embodiments of my invention,—

Fig. 4$^a$ diagrammatically indicates a gyroscope and one form of means for controlling thereby the steering means of the torpedo;

Fig. 4$^b$ is a detail representing a portion of the gyroscope or other direction-maintaining means;

In the ensuing specification, I shall, for convenience of description, refer to the vessel or submarine as carrying a torpedo or plurality thereof. It is, however, to be understood that within the scope and purpose of my invention, I may employ any suitable basal support for the torpedo or torpedoes, and that therefore such terms of description are not limiting designations.

Figure 1:
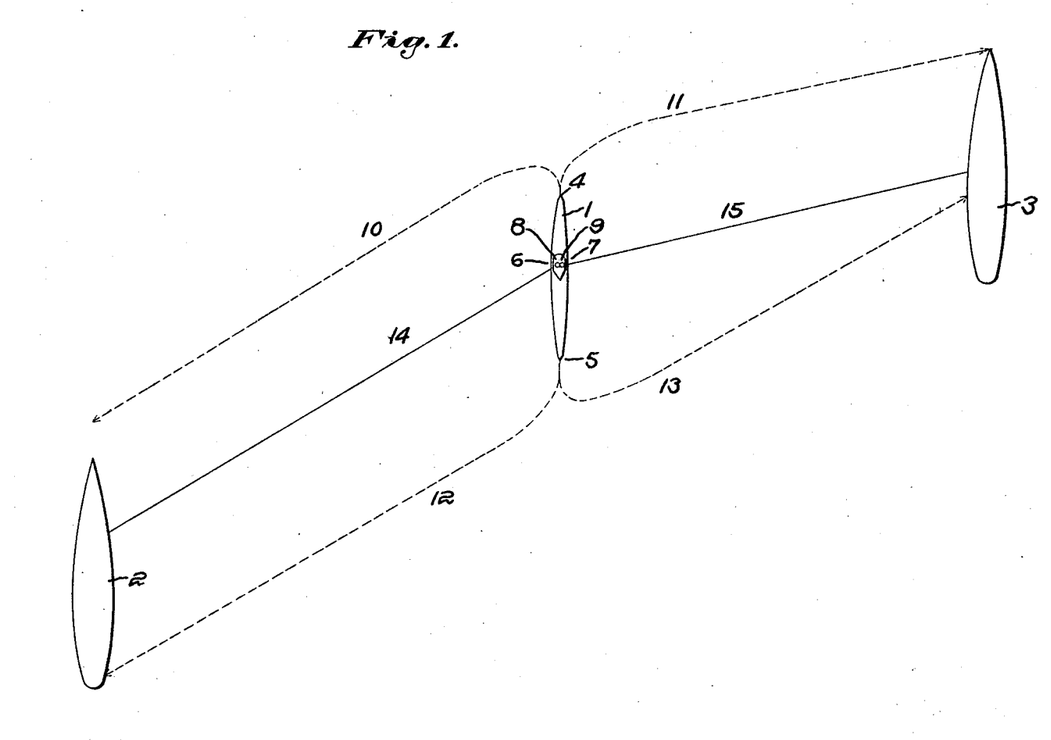
Figure 1 is a diagrammatic illustration of a vessel equipped with a plurality of torpedo tubes and two vessels to be attacked thereby, the control of the torpedo firing being in accordance with the principles of my invention.
Figure 2:
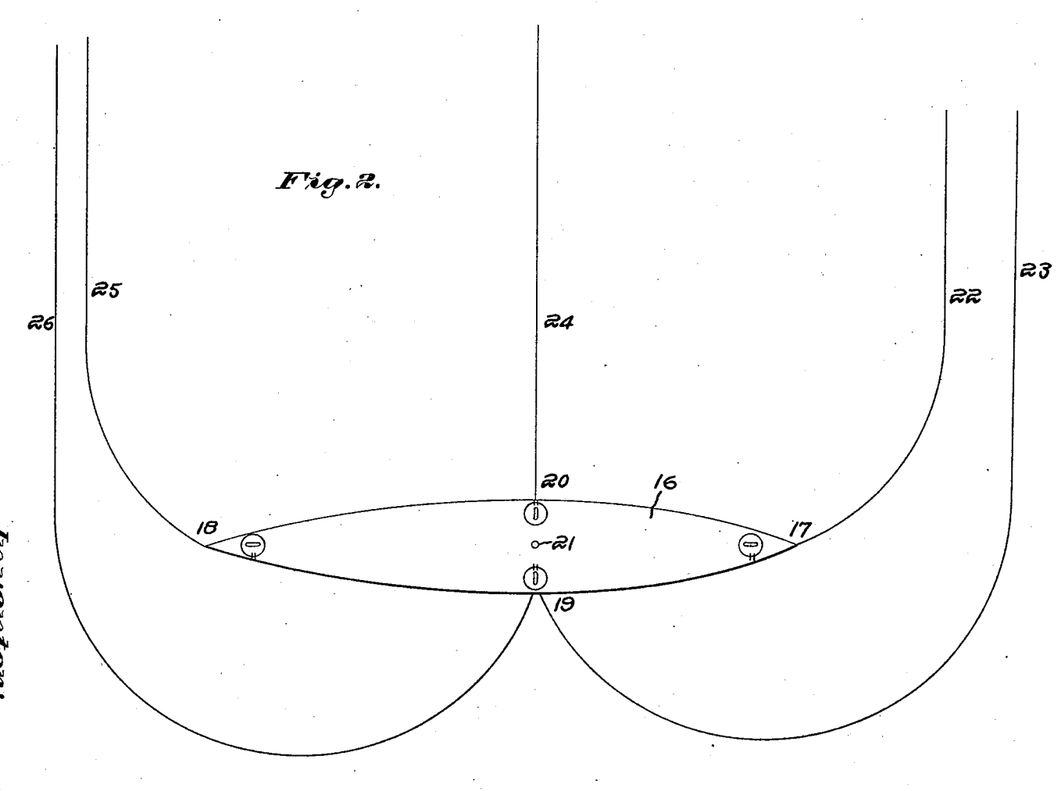
Fig. 2 is a diagrammatic illustration of a torpedo carrier, such, for example, as a submarine, equipped with a plurality of torpedo tubes adapted to be discharged therefrom simultaneously and in substantial parallelism of movement in accordance with my invention.
Figure 3:
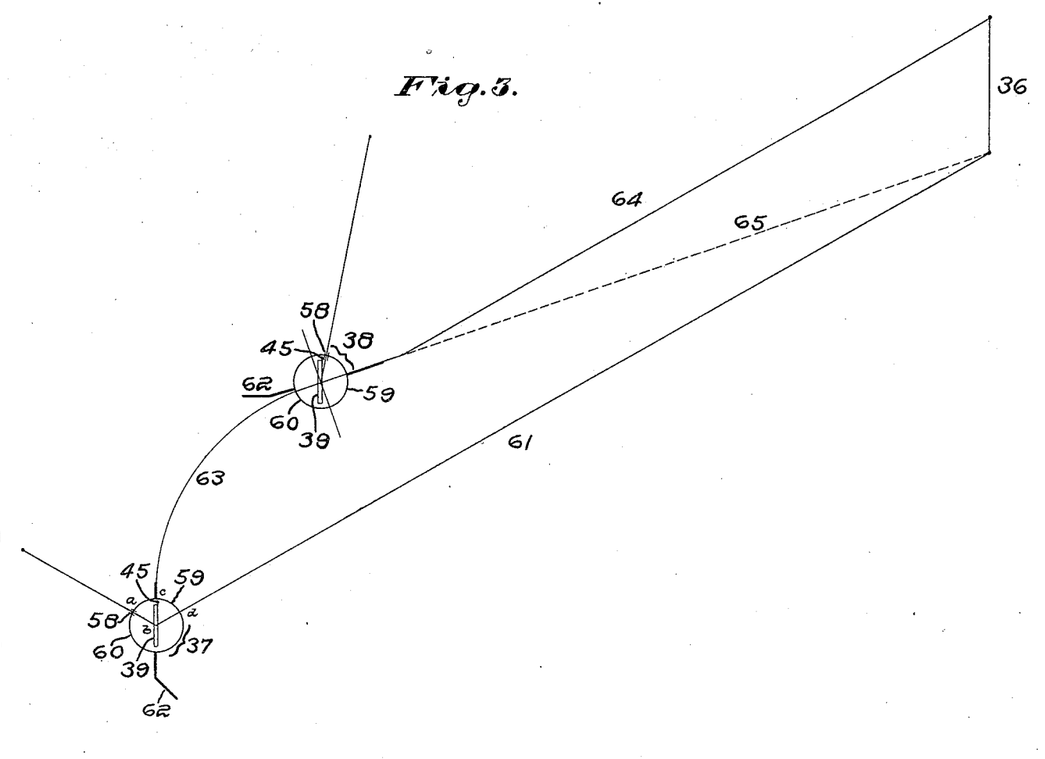
Fig. 3 is a further diagrammatic illustration indicating the movement of a discharged torpedo with respect to the object to be attacked thereby.

Referring more particularly to the drawings and first to Figs. 1, 2 and 3, I have, in Fig. 1, indicated a submarine or other suitable torpedo-carrying vessel at 1, and two hostile vessels at 2, 3, the said submarine vessel 1 being preferably equipped with a pair of torpedo tubes at the bow 4, a similar pair of tubes at the stern 5, and a single or if desired a pair of torpedo tubes at each side 6, 7. The said vessel is equipped with any suitable sighting means, preferably a periscope. In the construction shown in said Fig. 1, I have represented two periscopes at 8 and 9.

Viewing Fig. 1, it will be observed that the submarine 1 lies in a position which renders impossible the direct firing at the target of the torpedoes at the bow and stern thereof, in accordance with the method of firing in use prior to my invention. In accordance with my invention, it is possible to effect the firing of the torpedoes with the submarine in the position indicated, in such manner as to strike one or both of the vessels 2, 3. This is effected in a manner hereinafter more fully set forth in detail, by controlling the direction of movement of the discharged torpedo or torpedoes through and by the training movement of the sighting means, such, for example, as the periscope or periscopes.

In said Fig. 1, I have indicated the periscope 8 as controlling the direction of movement of a torpedo from one of the bow tubes 4, from the port tube or tubes 6 and from one of the stern tubes 5, and I have indicated the periscope 9 as controlling the direction of movement of the torpedoes discharged from the other bow tube 4, the starboard tube or tubes 7 and the other stern tube at 5. The torpedoes in each case are discharged from the tubes in whatever direction said tubes may face, and the discharged torpedoes, being controlled as hereinafter set forth by the periscope or periscopes, describe turning movements in the case of the torpedo discharged from the bow tubes 4, as indicated at 10, 11 and in the case of the stern tubes 5, as indicated at 12, 13. The torpedoes discharged from the port and starboard tubes 6 and 7 in the position in which the submarine 1 lies, may be discharged substantially directly at the vessels 2, 3, as indicated at 14, 15, or with a lesser turning movement than in the case of the bow and stern torpedoes.

It will be observed that the discharged torpedoes 10, 12, 14 and 11, and 15 respectively move in directions of general parallelism to the line of sight of the observer and the target. The course of the stern torpedo indicated at 13, it will be observed, is not in substantial parallelism with the courses of the torpedoes 11 and 15, but converges with respect thereto. This is effected by means hereinafter described, whereby the course of the torpedo may be varied from the course that would be normally established by the governing action of the periscope or other sighting means.

Heretofore as previously stated, it has been necessary to direct the longitudinal axis of the torpedo tube toward the vessel or other object to be attacked. Hence, it has been impossible to discharge a plurality of torpedoes in the same tubes or set of tubes simultaneously at different objects. In accordance with my invention, however, and as illustrated in diagram in Fig. 1, it is possible to fire a plurality of torpedoes at the same object or different objects, without altering the position of the submarine, said torpedoes being fired from tubes, the axes whereof are not in parallelism. In this manner, it is possible to concentrate the fire of a number of torpedo tubes upon a single vessel, and thus greatly to increase the chance of striking the same. Moreover, it is possible to discharge a plurality of torpedoes along paths that are either in parallelism or in convergence or divergence with respect to each other, said paths being so spaced from each other that if the vessel being attacked escapes one of said torpedoes, the chances of its escaping the other discharged torpedoes following the courses described, are very small.

Modern vessels of war approximate about four hundred feet overall length. If, now, I space the paths 10, 12 and 14 about four hundred feet apart, it will be seen that anywhere in a zone of eight hundred feet the vessel will be in danger of being struck by one of the torpedoes discharged along said paths. By firing all the available torpedoes in a single broadside toward the same object, it will be possible to cover an area of 1600 feet of travel of the target or vessel to be attacked. Thus, the chance of escape of such attacked vessel would be rendered substantially nil. The figures here given are, of course, illustrative merely, as I may so control the movement of the torpedoes as to space apart the paths thereof any desired distance.

In Fig. 2, I have represented a method of firing all the torpedo tubes in a single broadside at a single object or target. Therein, I have represented the submarine or other vessel at 16, the bow and stern torpedo tubes at 17, 18 and the starboard and port torpedo tubes at 19, 20. Any suitable sighting means may be employed. In this form of the invention, I have indicated a single periscope 21 for the purpose, although I am in no wise limited thereto. It will be observed that through said sighting means or other suitable control, I may effect the simultaneous or other discharge of the said torpedoes through paths 22, 23, 24, 25 and 26, which are brought into general parallelism and are directed toward the vessel or other object to be attacked. Within the scope of my invention, the said paths, or any of them, may be made to converge or diverge in any suitable manner.

Figure 4:
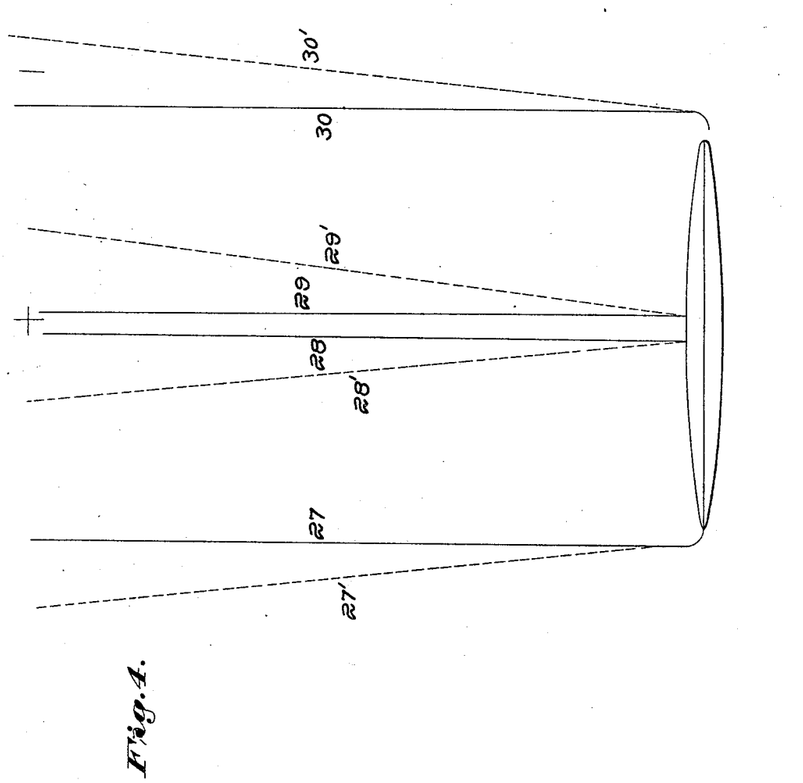
Fig. 4 is a further diagrammatic illustration indicating a vessel having a plurality of torpedo tubes, and means for effecting a divergence of firing of the torpedoes therefrom.

I have diagrammatically illustrated this application of my invention in Fig. 4, wherein I have indicated at 27, 28, 29 and 30 the substantially parallel paths of four torpedoes discharged from the bow and stern and from one side of the submarine or other vessel. It dotted lines at 27', 28', 29' and 30', I have indicated the divergence of the paths of said discharged torpedoes, one form of means for effecting said divergence being hereinafter disclosed.

Figures 4A, 4B:
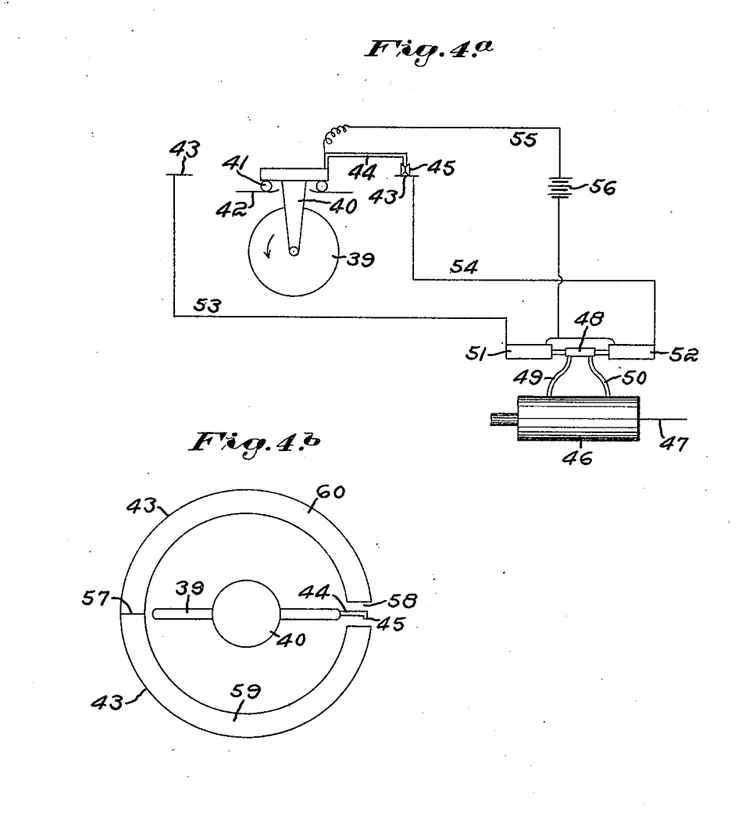

In Fig. 3, I have diagrammatically indicated at 36, the vessel to be attacked and have indicated at 37, 38 successive positions of a torpedo discharged from a submarine or other carrier or basal support therefor. In Fig. 4ª, I have indicated somewhat diagammatically, one form of means for controlling the steering means of the torpedo through direction-maintaining means herein represented as a gyroscope.

The form of the gyroscope may be that used in the standard type of Whitehead, Bliss-Leavitt, or Schwarzkopff torpedoes, or may be similar to the Sperry gyro compass or other gyroscopic compasses operated upon electrical principles.

In the several figures, I have indicated merely diagrammatically elements of a gyroscope. In said Fig. 4ª, I have represented the gyrostat thereof at 39, the same being suspended so as to maintain a fixed position in space with relation to its supports. I have herein represented said gyroscope as mounted for such rotation in a depending support 40, the same resting upon ball bearings 41, whereby it may itself rotate upon a suitable support or runway 42. In suitable relation to said support 40 is a so-called azimuth ring 43. The rotary support 40 is provided with a laterally extending arm 44 herein shown as having a roller 45 adapted to ride upon the said azimuth ring in the rotation of the said support 40. Instead of employing the said roller 45, I may employ any other suitable contact device.

I have indicated at 46 a servo-motor for controlling the steering apparatus that governs or controls the torpedo, the piston connected with the steering apparatus being indicated at 47. I have indicated at 48 a valve for controlling the admission of compressed air or other suitable motive fluid into said cylinder or servo-motor through the passages 49, 50. The said valve 48 is controlled by solenoids 51, 52, which are connected with the azimuth ring 43 and with the arm 44 by means of suitable conductors 53, 54, 55, a battery 56 or other suitable source of energy being interposed at the point indicated.

The azimuth ring 43 is provided with a line or zone of insulation and with a stop at 57 and with a break at 58 opposite thereto. The width of this break may be varied by any suitable adjusting means.

The construction illustrated in said Figs. 4ª and 4ᵇ is illustrative merely of a single form of the invention, inasmuch as any suitable steering means and any suitable direction-maintaining means to control the same may be employed.

Referring to Fig. 4ª, when the roller or contact maker 45 is in contact with either sector 59 or 60 of the azimuth ring, circuits will be closed through the battery 56 with either solenoids 51 or 52, so as to energize the rudder in such way as to cause the turning of the hull of the torpedo and azimuth ring 43 until the gyrostat 39 carrying the contact maker 45 assumes such a position that the contact maker 45 takes a position in the break of the said ring. At this point, the torpedo will be maintaining a practically straight course. However, this course will be slightly sinusoidal but having an amplitude not exceeding two feet.

In Fig. 3, I have represented at 37 elements of a torpedo positioned as though just discharged from the submarine or other torpedo carrier. It will be assumed that the periscope or other sighting means has been trained upon the target or vessel 36 to be attacked and that the line of vision 61 has been established. By means of the connections hereinafter described between the said periscope and the gyroscope or other direction-maintaining means, the azimuth ring 43 is turned, whereby the break 58 thereof is so positioned that the angle $a$—$b$—$c$ is equal to angle $c$—$b$—$d$. The break 58, however, will move oppositely in its rotation to the periscope and in direct ratio thereto. In this condition of the parts, the rudder assumes the position indicated at 62 and the effect thereof is to direct the torpedo along the curved path 63, bringing it into the position indicated at 38 in said Fig. 3, where the rudder 62 substantially straightens out and thereafter the torpedo moves in a straight path 64 toward and strikes the vessel 36. The path 65 indicated by dotted lines is that path which would bring the torpedo to the exact point viewed by the sighting mechanism on the submarine. However, due to the displacement necessarily occuring through the fact that the torpedo must travel to a certain distance before completing its turn, it is obvious that this ideal condition cannot be secured unless special attention be given to modifying the angle of rotation of the ring 43 in order to compensate for the said displacement. Such means may be employed within the scope and purpose of my invention.

In Fig. 3, I have shown the torpedo in the position of having overrun the desired course and showing that unless the above mentioned modification of the angle of rotation of ring 43 be made, since gyrostat 39 contacts with sector 60 of ring 43, rudder 62 is energized, so as to bring the hull of the torpedo and therefore the ring into such a position that contact 45 will be positioned between sectors 59 and 60. At this juncture the longitudinal axis of the torpedo will be along the line 64.

As heretofore stated, the sighting means may be of various types. I have chosen to illustrate my invention in connection with the periscope of a submarine vessel, though, as previously stated, I am in no wise limited thereto. Between such sighting means hereinafter represented as the periscope and the steering means of the torpedo, I provide any suitable operative connection, or association, or relation, whereby the training movement of the periscope upon the vessel or object to be attacked controls and governs the movement of the torpedo. This is preferably effected through the action upon the gyroscope or other direction-maintaining means heretofore referred to.

Figure 5:
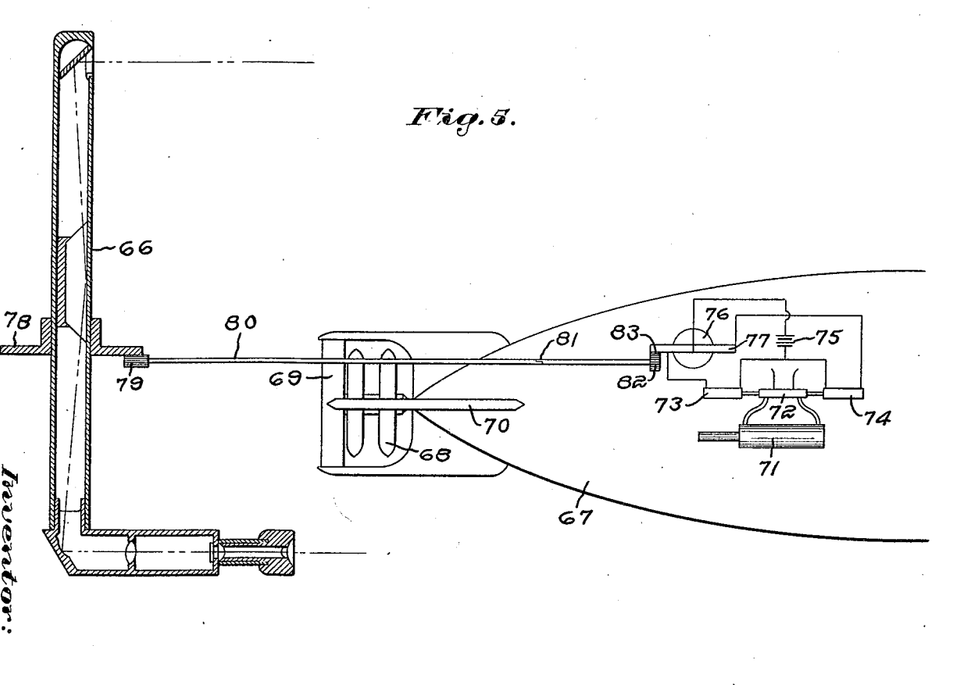
Fig. 5 is a view, partly in vertical section and partly diagrammatic, of the periscope of a submarine, and of a torpedo, the direction of movement whereof is controlled by that of the periscope.

In Fig. 5, I have indicated diagrammatically the periscope of a submarine at 66, the same being of any suitable or desired construction, not herein necessary more fully to disclose. I have indicated the hull of a torpedo at 67, the same having suitable propellers 68, vertical steering rudders 69 and horizontal diving rudders 70. These may be of any suitable construction, the said vertical steering rudders 69 being controlled by suitable servo-motor steering apparatus 71 preferably the same as the servo-motor 46 indicated in Fig. 4ª. The said servo-motor 71 is controlled by a valve 72 energized by solenoids 73 and 74 in circuit with the battery 75, said battery circuit being controlled through the action of the gyrostat 76 carrying a contact, not shown, contacting on the segments of the azimuth ring 77. While I have shown, in this embodiment, electrical apparatus in the control of servo-motor 71, it is to be understood that the ordinary pneumatic method of control, as embodied in the present type of torpedoes, can be equally well used.

I contemplate the provision of any suitable connecting or coöperating means between the said periscope or sighting means 66 and the said azimuth ring 77. For that purpose, I have in this embodiment of my invention represented the periscope as having fixed thereto a gear ring 78, the teeth whereof mesh with a pinion 79 fast on a shaft 80 extending through a separable clutch 81 into the torpedo where it is provided at its end with a pinion 82 meshing with teeth 83 upon the azimuth ring 77. In the manner described or in any other suitable manner, a movement of partial rotation of the periscope or other sighting means 66 effects a simultaneous movement of the azimuth ring 77 to an equal extent and in an opposite direction, as diagrammatically indicated in Fig. 4.

Therefore, the act of training the periscope or other sighting means upon the vessel to be attacked, automatically effects a synchronous movement of the azimuth ring or of any other suitable form of direction-maintaining means, whereby the discharged torpedo is caused to move along a path such as heretofore described with the result that it strikes the object upon which the periscope is trained. When the torpedo is discharged, the shaft 80 separates at the clutch 81.

It will be observed from the foregoing description that in the disclosed embodiment of my invention, the movement of rotation of the periscope or other sighting means and the movement of the azimuth ring 77 are in opposite directions. This may be effected in any desired manner, the connections for this purpose being merely illustrative and susceptible of widely varying changes within the scope and purpose of my invention.

Figure 6:
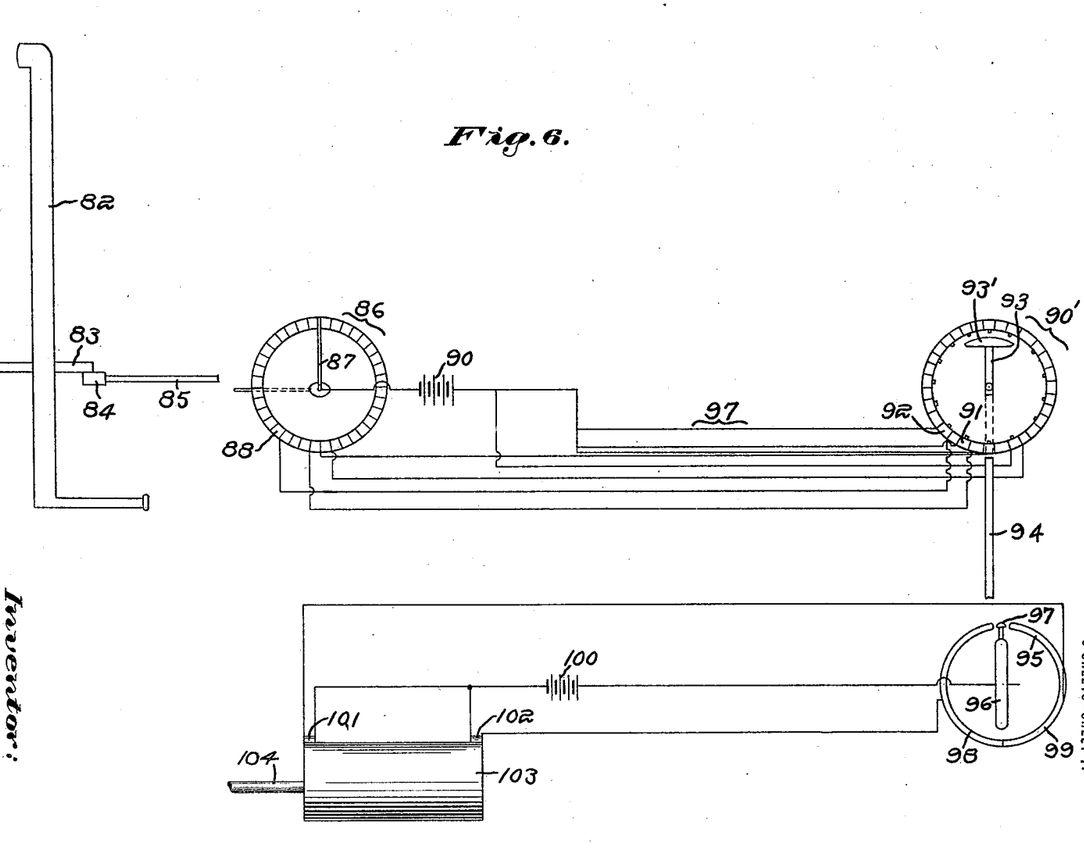
Fig. 6 is a view, mainly diagrammatic, of the periscope of a submarine and the mechanism of a torpedo controlled thereby, with electrical connections intermediate said periscope and torpedo.

In Fig. 6, I have illustrated a slightly modified form of the invention wherein electrical connections are provided between the periscope or other sighting means and the direction-maintaining means of the torpedo. In said figure, I have diagrammatically indicated the periscope at 82, the same being provided with any suitable means for effecting conjoint movement thereof and of means associated with the direction-maintaining means of the torpedo. For this purpose, I have herein represented the said periscope as having a gear 83 meshing with a pinion 84 upon a shaft 85, said shaft being fixed to and rotating a switch or commutator 86 positioned in the conning tower or other suitable part of the submarine. A rotating arm 87 moves circumferentially over the face of a number of contacts 88, 89, etc., suitably positioned in circumferential relation upon the commutator face. The said rotatable arm 87 by contact with the said segments 88, 89, etc. closes a circuit through battery 90, allowing current to pass through electromagnets 91, 92, etc. positioned in a repeating device 90' located in the torpedo. Concentrically positioned with respect to the electromagnets and upon a rotatable arm 93 is affixed an armature 93' of suitable material, which is attracted by the energization of the said circumferentially arranged electromagnets 91, 92, etc. Thus, through the energization of the said electromagnets by the rotation of arm 87, the rotatable armature 93' is caused to move in synchronism therewith. The two arms 87, 93 will therefore always maintain positions parallel to each other and will always operate synchronously. The rotatable armature 93' is connected to a shaft 94 carrying the azimuth ring 95. Thus, with the rotation of the armature 93', there is imparted a corresponding rotation to the azimuth ring 95 about the gyrostat 96 whose operative position is one fixed in space. The electrical connections between the commutator 86 and repeater 90' are maintained through the medium of a multiple cable indicated generally and diagrammatically at 97. Said multiple cable is provided with a detachable plug (not herein shown) fixed to the body of the torpedo so that with the firing of the torpedo, the cable connection will be automatically broken.

As hereinbefore described the gyrostat carries a contact maker 97 positioned so as to contact with sectors 98, 99 of the azimuth ring, said gyrostat thereby controlling the current from battery 100 through electro-pneumatic valves 101, 102 to effect the energization of the servo-motor 103 energizing the steering gear 104 in a manner that need not be more fully herein set forth.

In Fig. 4, I have diagrammatically indicated the divergence of the paths of travel of a plurality of torpedoes discharged from the submarine or other torpedo carrier. Such divergence or convergence is effected in any suitable manner. For this purpose, I have, in Fig. 7, indicated manually controlled means whereby the paths normally imparted to the torpedoes through the agency of the periscope or other sighting means are themselves modified so as to secure such described convergence or divergence.

Figure 7:
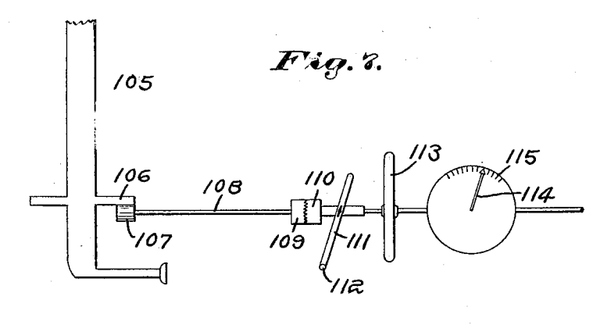
Fig. 7 is a partially diagrammatic and partially side elevation of the periscope of a submarine and of the mechanism of a torpedo controlled thereby, and disclosing manually controlled means for effecting divergence or convergence of the fire of torpedoes from the vessel.

In said figure, I have diagrammatically indicated the periscope at 105, the same having a gear 106 meshing with a pinion 107 on the shaft 108 provided with clutch members 109, 110 adapted to be thrown into and out of mesh by a suitable lever 111 pivoted at 112 for manual operation. The said shaft 108 may be either arranged so as mechanically to effect the rotation of the direction-maintaining elements as hereinbefore described, or may directly effect the rotation of a commutator and electrical devices in the manner shown in Fig. 6 or in any other suitable manner. Said shaft 108 is provided with a hand wheel 113 fast thereon. The shaft in its rotation effects the rotation of an indicator dial 114 graduated circumferentially in degrees as indicated at 115. Thus, after the position of the periscope is fixed with relation to the target, in order to secure the necessary additional angular changes in the ensuing path of the torpedo to be discharged, the operator disconnects the clutch members 109, 110 and rotates the shaft 108 manually through the hand wheel 113 until the indicator 114 assumes or designates the desired position of angular deflection. Thereupon the torpedo or torpedoes are fired according to the usual method of electrical firing from the conning tower.

It will be obvious that the means shown in Fig. 7 for effecting a convergence or divergence of the path of travel of the torpedoes is illustrative merely of the broad principle of my invention, inasmuch as the same result may be effected in many other ways within the scope thereof.

Figure 8:
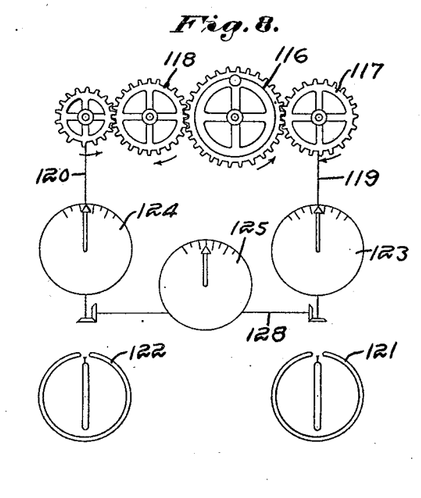
Fig. 8 is a view, partially diagrammatic and partially in plan, of means for effecting convergence or divergence of the fire of a plurality of torpedoes from a vessel or other basal support.

In Fig. 8, I have diagrammatically illustrated further means to obtain either convergence or divergence of the paths of travel of a plurality of torpedoes. Therein gear wheel 116 located in the conning tower of a submarine, when rotated, causes through gears 117, 118 and shafts 119, 120 fixed to the azimuth rings 121, 122, the rotation of said rings in either a diverging or a converging manner according to the original direction of movement of the gear 116, which may be either clockwise or contraclockwise. Inasmuch as the azimuth rings 121, 122 pertain to the individual direction-maintaining means located in the bodies of separate torpedoes, it is evident that the courses of said torpedoes will be either convergent or divergent according to the position of the said azimuth rings 121, 122 through the rotation either clockwise or contraclockwise of gear 116. I have moreover indicated telltale dials 123, 124, 125, indicating, as in Fig. 7, the angular deviation of the courses of the torpedoes. The indicator dial 125, more fully illustrated in Fig. 9, carries thereon two rotatable and indicating arms 126, 127. Said arms move either in a divergent or convergent manner through the action of intermediary shafts 128 and 119, 120 (Fig. 8) according to the direction of rotation of the controlling hand gear 116. In order that the operator may more easily detect the exact angular relation between the courses of the separate torpedoes, rotatable indicator arm 127 (Fig. 9) has affixed thereto a segmental scale 129 passing over the indicator 126. The angle a—b—c may therefore be directly read through the agency of the said scale.

Figure 9:
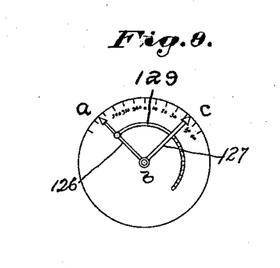
Fig. 9 is a detail showing indicating means which may be employed in connection with the fire of a plurality of torpedoes.

The structure illustrated in Figs. 8 and 9 may be, of course, widely varied from, as it indicates merely one form or manner of means for controlling and indicating the convergence or divergence of the paths of movement of a plurality of torpedoes.

Figure 10:
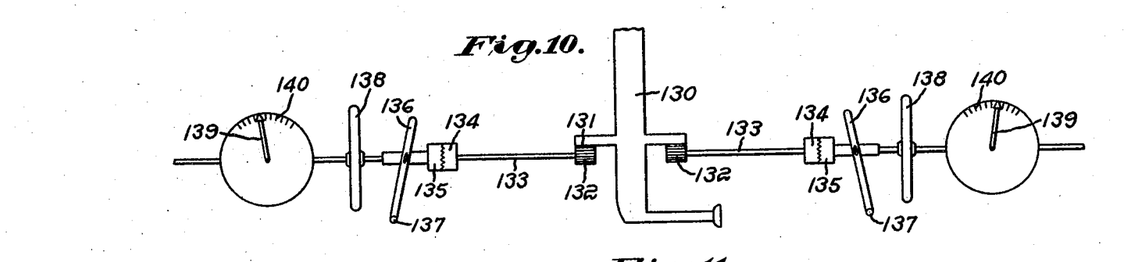
Fig. 10 is a view partially diagrammatic and partially in elevation illustrating one form of manually controlled means for effecting divergence or convergence of the fire of a pair of torpedoes from the vessel.

In Fig. 10, I have represented means similar to that shown in Fig. 7 but adapted to control the path of travel of torpeedoes discharged from two different tubes or supports. In said figure, I have diagrammatically indicated the periscope at 130, the same having a gear 131 meshing with two pinions 132, 132 upon shafts 133, 133 that are provided with clutch members 134, 135 adapted to be thrown into and out of mesh by suitable levers 136 pivoted at 137 for manual operation. The said shafts 133 may be either arranged so as mechanically to effect the rotation of the direction-maintaining element as hereinbefore described, or may directly effect the rotation of a commutator and electrical devices in the manner shown in Fig. 6, or any other suitable manner. Each of the shafts 133 is provided with a hand wheel 138 fast thereon. Each shaft in its rotation effects the rotation of an indicator dial 139 graduated circumferentially in degrees, as indicated at 140. Thus, after the position of the periscope is fixed with relation to the target, in order to secure the necessary additional angular changes in the paths of the pair of torpedoes to be discharged, the operator or operators disconnect the clutch members 134, 135 and rotate the shafts 133 manually through the hand wheels 138 until the indicators 139 assume or designate the desired position of angular deflection. Thereupon the pair of torpedoes are fired according to the usual method of electrical firing from the conning tower. It is evident that the control represented in Fig. 10 or any other suitable control may be employed for more than a pair of torpedoes that rest in their tubes, as, for example, to a whole broadside consisting of bow and stern torpedoes and a plurality of torpedoes positioned along either side of the ship.

Figures 11, 12:
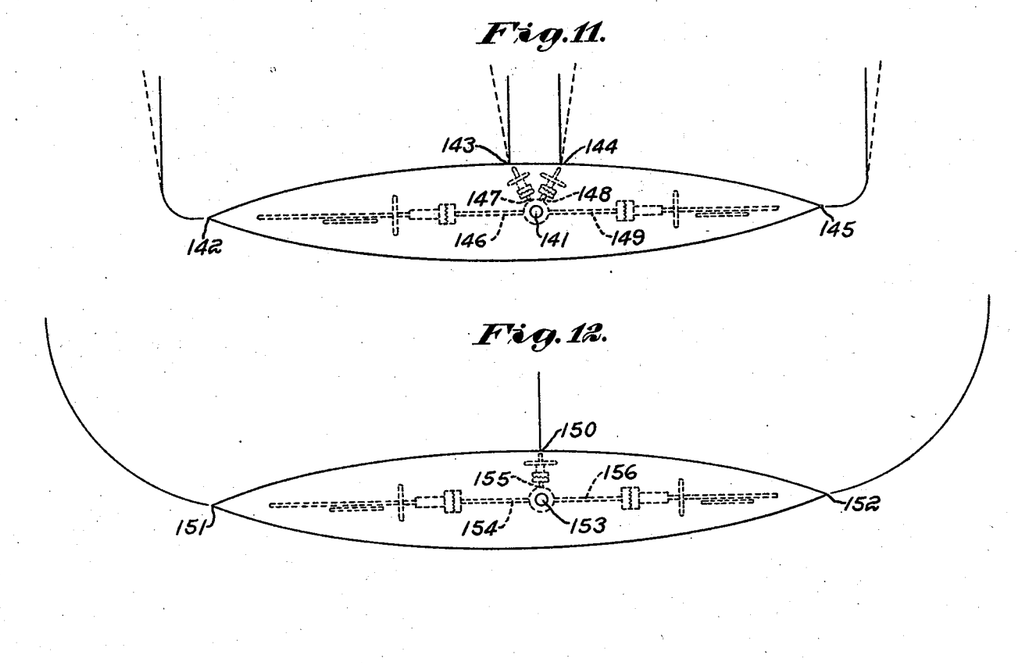
Fig. 11 is a view, partially in plan and partially diagrammatic, representing the control for a broadside of torpedoes.
Fig. 12 is a similar view representing the control for the torpedoes at both ends of the vessel and at one side thereof.

In Fig. 11, I have shown an arrangement similar to that in Fig. 10, wherein the periscope is diagrammatically indicated at 141, and the position of the several torpedo tubes is indicated at 142, 143, 144, 145. The shafts whose rotation is controlled by that of the gyroscope 141 are represented at 146, 147, 148, 149, and in each case I preferably provide clutches and hand wheels together with indicators, as represented in Fig. 10.

In Fig. 12, I have shown a system or arrangement similar to that in Fig. 11, with the exception that I have shown but a single torpedo tube at one side of the vessel as at 150. I have indicated bow and stern torpedo tubes at 151, 152, and the torpedoes from the single tubes are controlled from the periscope 153 through the shafts 154, 155 and 156 in the manner already fully described in connection with Fig. 10.

It is, of course, obvious that any other suitable means may be employed in connection with a plurality of torpedoes to effect convergence or divergence of said torpedoes with respect to the target.

In the disclosed embodiment of the invention I have represented means whereby the movement of the sighting means controls and modifies the paths of movement of the discharged torpedoes. Within the broad scope and purpose of my invention, instead of operatively connecting the sighting apparatus itself with the torpedoes or the direction-maintaining elements thereof, I may provide a centralized control so related to or positioned with respect to the sighting apparatus that as the sighting apparatus is turned or after it has been turned, the said centralized control may be correspondingly turned or moved, thereby to modify or govern the action of the torpedoes. I regard such use of a centralized control as within the scope of my invention, inasmuch as it will be evident that in such case the sighting means would be employed not only for the purpose of locating the object to be attacked, but also for the purpose of directly or indirectly modifying or governing the paths of movement of the discharged torpedoes.

From the foregoing description, it will be evident that through the action of sighting means of any suitable type or construction, herein embodied as a periscope, I control the path or paths of movement of one or more torpedoes fired from any suitable basal support. My invention comprehends broadly the described method of control, whereby the objects and results herein set forth are secured.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Apparatus for controlling torpedo firing comprising sighting means, a torpedo, direction maintaining apparatus for the torpedo, and means controlled by said sighting means to modify the action of said direction maintaining apparatus upon said torpedo, said means being adjustable further to modify the action of said direction maintaining apparatus, whereby the actual path of the discharged torpedo is varied from that which otherwise would be imparted by said modifying means.

2. An apparatus for controlling torpedo firing comprising sighting means, a plurality of torpedoes, direction maintaining apparatus for each of said plurality of torpedoes, means controlled by said sighting means to modify the action of said direction maintaining apparatus upon said plurality of torpedoes, and means to adjust said modifying means, whereby the actual paths of the plurality of discharged torpedoes may be made to converge or to diverge.

3. Apparatus for controlling torpedo firing comprising sighting means, a fixed torpedo tube, a torpedo at rest in said tube, direction maintaining apparatus carried by said torpedo, and means controlled by said sighting means to modify the action of said direction maintaining apparatus upon said torpedo, said means being adjustable further to modify the action of said direction maintaining apparatus, whereby the actual path of the discharged torpedo is varied from that which otherwise would be imparted by said sighting means.

4. Apparatus for controlling torpedo firing comprising sighting means, a torpedo, a gyroscope carried by said torpedo, and means controlled by said sighting means to modify the action of said gyroscope upon said torpedo, said means being adjustable further to modify the action of said gyroscope, whereby the actual path of the discharged torpedo is varied from that which otherwise would be imparted by said gyroscope.

5. Apparatus for controlling torpedo firing comprising sighting means, a plurality of torpedoes, a gyroscope carried by each of said plurality of torpedoes, means controlled by said sighting means to modify the action of said gyroscopes upon said plurality of torpedoes, and means to adjust the said modifying means, whereby the actual paths of the plurality of discharged torpedoes may be made to converge or diverge.

6. Apparatus for controlling torpedo firing comprising sighting means, a torpedo, direction maintaining apparatus for the torpedo, and electrical connections from said sighting means to said direction maintaining apparatus to modify the action of said direction maintaining apparatus upon said torpedo, said connections being adjustable further to modify the action of said direction maintaining apparatus, whereby the actual path of the discharged torpedo is varied from that which would otherwise be imparted by said modifying means.

7. Apparatus for controlling torpedo firing comprising sighting means, a torpedo, direction maintaining apparatus for the torpedo, means controlled by said sighting means to modify the action of said direction maintaining apparatus upon said torpedo, and manually operable adjusting means to adjust said modifying means whereby the actual path of the discharged torpedo is varied from that which would otherwise be imparted by said modifying means.

8. Apparatus for controlling torpedo firing comprising sighting means, a vessel carrying said sighting means having bow and stern torpedo tubes, torpedoes at rest in said tubes, direction maintaining apparatus carried by each of said torpedoes, and means controlled by said sighting means to modify the action of said direction maintaining apparatus upon said bow and stern torpedoes, said means being adjustable further to modify the action of the said direction maintaining apparatus relatively to each other, whereby the actual firing of the torpedoes discharged from said bow and stern torpedo tubes is varied from that which would otherwise be imparted by said sighting means.

9. The combination of a torpedo launching tube for automobile torpedoes having a gyroscopic steering gear, an aiming device, and means adapted operatively to connect said aiming device with the gyroscopic steering gear of a torpedo at rest in said tube in such manner that said steering gear is trained with said aiming device, said means being adjustable further to modify or alter the path of the torpedo from that which would be imposed through said connecting means.

10. An apparatus for controlling torpedo firing comprising sighting means, a torpedo, direction maintaining apparatus for the torpedo, means controlled by said sighting means to modify the action of said direction maintaining apparatus upon said torpedo, and additional means co-acting with said direction-maintaining apparatus and with said sighting means whereby to vary the path of the discharged torpedo from that which would be imposed by the action of said controlled means.

11. An apparatus for controlling torpedo firing comprising a basal support for a plurality of torpedoes, a plurality of torpedoes supported thereby, each having direction maintaining means, a centralized control for said plurality of torpedoes operatively associated with and adapted to modify the action of the direction maintaining means of said torpedoes, and additional means also operatively associated with said direction-maintaining means and with said centralized control whereby the paths of the discharged torpedoes are relatively changed with respect to each other from those which would otherwise be imparted by said centralized control.

12. Apparatus for controlling torpedo firing comprising in combination, a basal support, a plurality of torpedoes controlled thereby, sighting means adapted to be trained upon the object to be attacked, and means whereby the training of said sighting means controls the direction of movement of said torpedoes and including means to modify the movement of the discharged torpedoes to effect divergence or convergence thereof.

13. An apparatus for controlling torpedo firing comprising, in combination, a basal support, a plurality of torpedoes carried thereby, sighting means adapted to be trained upon the object to be attacked and means whereby the training movement of the sighting means controls the movement of the discharged torpedoes, said controlling means including manually controlled means for securing convergence or divergence of movement of the discharged torpedoes.

14. An apparatus for controlling torpedo firing comprising in combination, a basal support for a plurality of torpedoes, a plurality of torpedoes supported thereby with their longitudinal axes out of parallelism, sighting means adapted to be trained upon an object to be attacked, and means controlled by said sighting means for causing all of said discharged torpedoes to move toward the object to be attacked whereby convergence of fire of said plurality of torpedoes is effected.

15. Apparatus for controlling torpedo firing comprising in combination, a basal support for a plurality of torpedoes, a plurality of torpedoes supported thereby with their longitudinal axes out of parallelism, sighting means to be trained upon the object to be attacked, and means including operative connections from said sighting means to said torpedoes whereby the training of said sighting means effects the movement of each of said plurality of discharged torpedoes to bring them into substantially parallel lines of movement toward the object to be attacked.

16. An apparatus for controlling torpedo firing comprising in combination, a vessel having a torpedo tube at each end and one or more torpedo tubes intermediate said ends, sighting means adapted to be trained upon the object to be attacked, and means controlled by said sighting means and operatively connecting the same with the torpedoes in all of said tubes whereby torpedoes discharged from all of said tubes are brought into general parallelism in movement toward the object to be attacked.

17. An apparatus for controlling torpedo firing comprising in combination, a basal support for a plurality of torpedoes, a plurality of torpedoes supported thereby with their longitudinal axes out of parallelism, sighting means adapted to be trained upon an object to be attacked, and means controlled by said sighting means, said means being adjustable, whereby convergence of fire of said plurality of torpedoes is effected, and all of said discharged torpedoes are thereby caused to be moved toward the object to be attacked.

18. A system for controlling torpedo firing comprising in combination, sighting means, a plurality of torpedoes, direction maintaining apparatus for each of said torpedoes, means controlled by said sighting means to modify the action of said direction maintaining apparatus upon said torpedoes, and means operable independently of said sighting means for causing an auxiliary modification of the action of said direction maintaining apparatus, whereby the combined modifying actions causes a predetermined convergence or dispersion of the actual paths of the plurality of torpedoes when discharged.

19. A system for controlling torpedo firing comprising in combination, sighting means, a plurality of torpedoes, direction maintaining apparatus for each of said plurality of torpedoes, means controlled by said sighting means for modifying the action of said direction maintaining apparatus upon said torpedoes, and separate means operable independently of said sighting means for causing a predetermined auxiliary modification of the action of said direction maintaining apparatus upon any one or more of said torpedoes, whereby the combined modifying actions causes a predetermined convergence or dispersion of the actual paths of the plurality of torpedoes when discharged.

20. A system for controlling the firing of projectiles, comprising a plurality of projectiles, sighting means arranged to control the angle of fire of the respective projectiles with respect to a target, and means operating independently of said sighting means for imposing a predetermined auxiliary angle of fire upon the respective projectiles, whereby the combined angle fire control causes a predetermined conversion or dispersion of the paths of flight of said projectiles toward said target.

21. A system for controlling the firing of projectiles, comprising in combination, a controlling element, a plurality of projectiles, a direction maintaining apparatus carried by each of said projectiles, means arranged by said controlling elements to modify the action of said direction maintaining apparatus upon said projectile and means operable independently of said controlling element for causing the auxiliary modification of the action of said direction maintaining apparatus whereby the combined modifying actions causes a predetermined conversion or diversion of the actual paths of a plurality of projectiles when discharged.

22. A system for controlling the firing of projectiles, comprising a plurality of projectiles, an element arranged to control the angle fire of all of said projectiles, and means operating independently of said controlling element for imposing a predetermined auxiliary angle fire upon the respective projectiles, whereby the combined angle fire control causes a predetermined conversion or diversion of the paths of flights of said projectiles toward a target.

23. A system for controlling the firing of projectiles, comprising an element arranged to control an angle of fire of a plurality of projectiles, means operating independently of said controlling element for imposing a predetermined auxiliary angle fire upon one or more of said projectiles whereby the combined angle fire control causes a predetermined conversion or diversion of the paths of flight of said projectiles toward a target.

In testimony whereof, I have signed my name to this specification, in the presence of two subscribing witnesses.

JOHN HAYS HAMMOND, Jr.

Witnesses:
 IRVING U. TOWNSEND,
 ROBERT H. KAMMLER.